United States Patent [19]
Del Rosario

[11] Patent Number: 5,557,910
[45] Date of Patent: Sep. 24, 1996

[54] DISCHARGE DOOR STRUCTURE FOR A NARROW ROW COTTON PICKER

[75] Inventor: Roberto N. Del Rosario, Des Moines, Iowa

[73] Assignee: Deere & Company, Moline, Ill.

[21] Appl. No.: 497,062

[22] Filed: Jun. 30, 1995

[51] Int. Cl.⁶ ................................................. A01D 46/08
[52] U.S. Cl. ...................................... 56/30; 56/40
[58] Field of Search ........................... 56/30, 28, 31, 56/32, 40, 44, 50, 1

[56] References Cited

U.S. PATENT DOCUMENTS

| | | | |
|---|---|---|---|
| 4,817,370 | 4/1989 | Deutsch et al. | 56/28 X |
| 4,821,497 | 4/1989 | Deutsch et al. | 56/41 |
| 5,014,502 | 5/1991 | Richman et al. | 56/41 |
| 5,247,786 | 9/1993 | Schreiner | 56/41 |
| 5,471,826 | 12/1995 | Schreiner | 56/41 |

Primary Examiner—Terry Lee Melius

[57] ABSTRACT

A cotton picker row unit includes a specially configured access door which is pivotally connected to the front structural post of the unit so that forward movement of the door against an adjacent row of cotton plants will act to close the door, even if the door is unlatched. The front pivot also provides more unrestricted access to the rear harvesting structure. The door has an offset cross section so that the cotton passage defined by the door is wide at the top and narrow at the bottom to provide a funnelling effect of cotton toward the discharge area leading into the conveying duct. The offset cross section strengthens the door and increases the accommodation space for the adjacent row of cotton plants so that cotton planted in very narrow row spacings can be harvested with minimal plant damage and cotton loss.

24 Claims, 2 Drawing Sheets

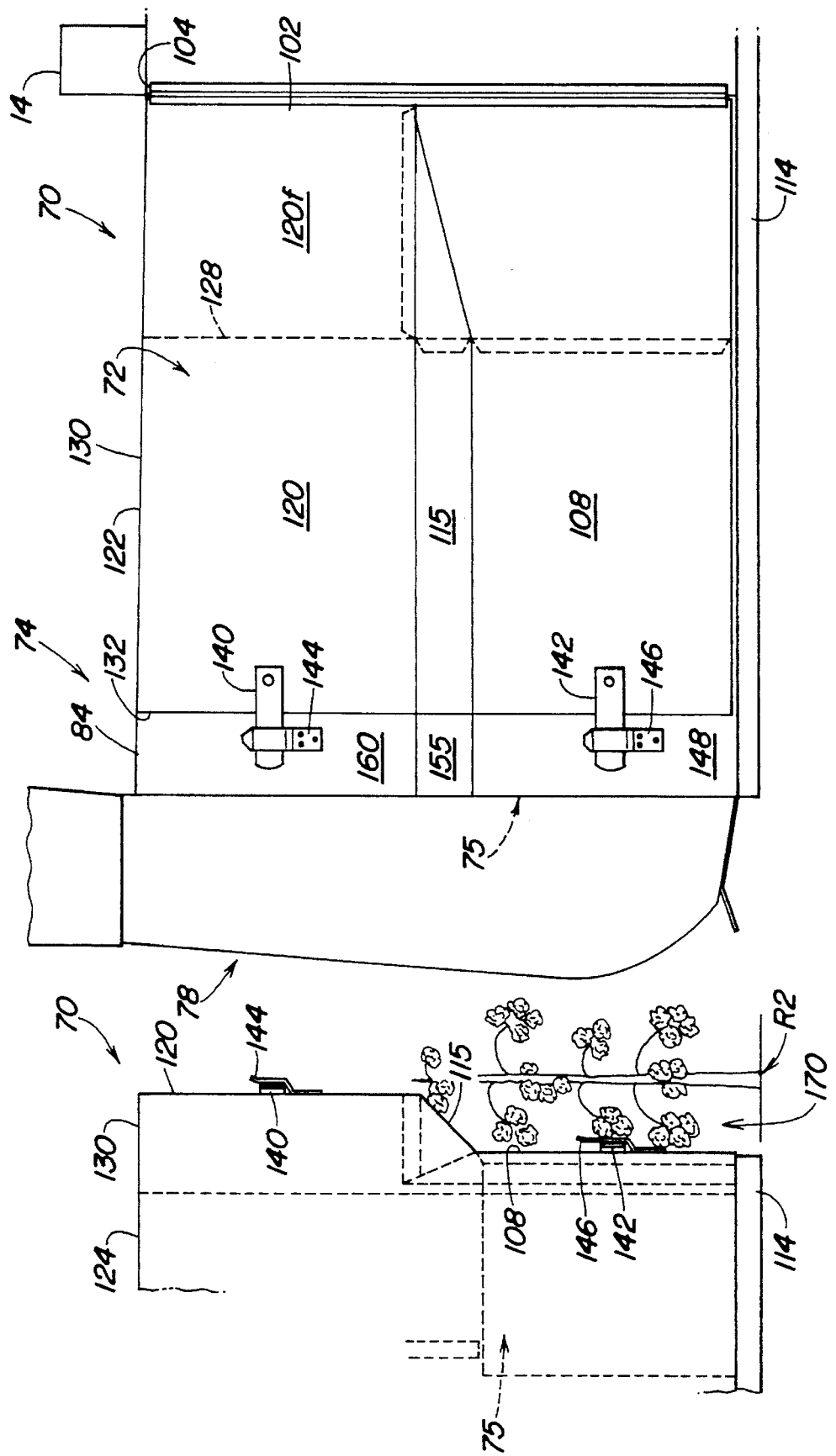

DISCHARGE DOOR STRUCTURE FOR A NARROW ROW COTTON PICKER

BACKGROUND OF THE INVENTION

1. Field of the Invention

The present invention relates generally to cotton harvesters, and, more specifically, to door structure for a cotton harvester row unit.

2. Related Art

Cotton harvesters such as the John Deere 9965 Cotton Picker include transversely spaced row units, each with tandem upright spindle drums supported in a housing on one side of the row of cotton being harvested. A pair of upright doffers remove cotton from the spindles and direct the cotton outwardly and rearwardly to suction door structure which opens rearwardly into an air duct leading to the harvester basket. To provide access to the harvesting mechanism within the housing, a generally planar access door is pivotally connected to the door structure adjacent the rear doffer area and has a forward edge releasably latched near the front doffer area to close the side of the door structure. When the latch is released, the access door may be swung outwardly about the rear pivot so the operator can inspect and access the mechanism from the forward portion of the row unit.

Several problems exist with currently available access doors. The generally planar door is fabricated from metal and can bend relatively easily. Since the door typically latches at the forward end and pivots about a rear hinge, the adjacent row of plants can force open and damage the door as the harvester moves forwardly through the field if the latch should inadvertently be left in the release position or if the door should otherwise come open. Fabricating the door from a lighter weight plastic material heretofore has not been practical because of the relatively large door size and planar construction. Further, access to the door pivot area is limited making visual inspection and field maintenance difficult around the rear drum and rear doffer.

Some cotton growing areas have row spacings that are too narrow to be accommodated by conventional harvesting units. If mechanical harvesting methods are used in these areas, cotton is lost and plants are damaged in adjacent rows. Often, the narrow row cotton is shorter and less dense, but the weight of the cotton makes the branches lean so the lower part of the plant tends to spread out. This spreading of the lower part of the cotton plant increases problems of efficiently harvesting narrow row cotton without adjacent row plant damage and loss of crop.

BRIEF SUMMARY OF THE INVENTION

It is therefore an object of the present invention to provide improved narrow row cotton harvester structure. It is a further object to provide such an improved structure which overcomes most or all of the problems listed above.

It is a further object of the present invention to provide an improved door structure for a cotton harvester which improves cotton flow. It is a further object to provide such a structure which is stronger than most previously available door structures and which includes a pivoting access door which is less subject to damage during harvesting than most previously available access doors.

It is still a another object of the present invention to provide such cotton harvester row unit door structure which is configured to be stronger than most previously available door structures and which funnels cotton more efficiently toward the discharge opening that leads to the cotton conveying duct. It is yet a further object to provide such a structure which lessens adjacent row cotton plant damage and cotton loss, particularly in very narrow row cotton.

It is still another object of the present invention to provide an improved door structure for a cotton harvester, the structure having an access door which opens in a manner to provide better viewing of and access to the harvesting structure in the row unit housing. It is a further object to provide such a structure which is particularly useful with rear tractor-mounted tandem drum row units spaced for harvesting very narrow row cotton.

Cotton harvester door structure constructed in accordance with the teachings of the present invention includes an access door having a forward end pivotally connected to the existing front post of a row unit for swinging between an open access position and a closed harvesting position. The access door defines the outer wall of the door structure and has an offset cross section defining a cotton passage that is wide at the top of the unit and narrow at the bottom to give a funnelling effect that directs the cotton towards the bottom of the air intake to the cotton conveying duct leading to the harvester basket. The offset also provides additional access door strength and increased clearance for the lower portions of the cotton plants in the adjacent cotton row so plant damage and cotton loss are reduced. During the picking operation, the adjacent row plants pushing against the forwardly pivoted access door will tend to keep the door closed and prevent door damage, even if the door should become unlatched. The front pivot location on the access door reduces work space constraints that heretofore were present on conventional row unit structures. In rear tractor-mounted narrow row cotton pickers, the forward door pivot provides relatively easy and unrestricted access to the harvesting structure from the rear of the units. The row unit can efficiently harvest cotton planted in row spacings less than the width of the row unit.

These and other objects, features and advantages of the present invention will become apparent to one skilled in the art upon reading the following, detailed description in view of the drawings.

BRIEF DESCRIPTION OF THE DRAWINGS

FIG. 2 is a partial side view of one of the row units shown in FIG. 1 showing the door and duct structure for the unit.

FIG. 3 is a rear view of a portion of the row unit of FIG. 2 showing the offset cross section of the door structure on the unit.

DETAILED DESCRIPTION OF THE DRAWINGS

Figure 1:
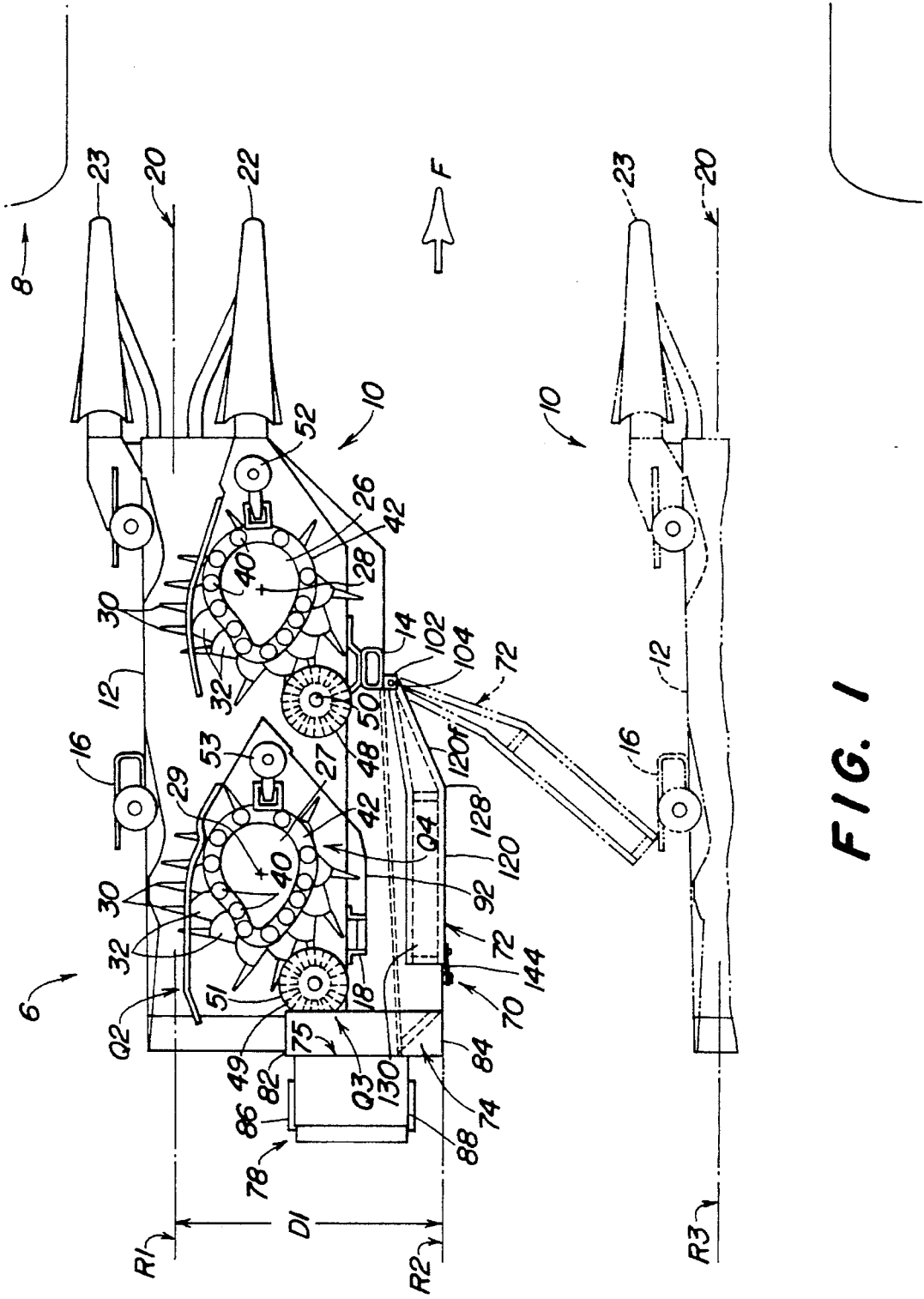
FIG 1. is top view of a portion of a tractor-mounted cotton picker with a pair of row units mounted rearwardly of the tractor drive wheels.

Referring now to FIG. 1, therein is shown a cotton harvester 6 mounted on the rear of a tractor 8 for forward movement (F) over a field. The harvester 6 includes row units 10 transversely spaced on support structure (not shown) generally identical to that on the John Deere 9965 Cotton Picker for harvesting parallel rows of cotton plants (such as indicated at R1–R3 of FIG. 1).

Each row unit 10 includes a housing 12 having upright structural members at locations 14–18. A fore-and-aft extending row-receiving area 20 is defined which extends rearwardly from between right and left stalk lifters 22 and 23 through to the rear of the housing 12. Front and rear upright picker drums 26 and 27 with upright rotational axes 28 and 29 are supported within the housing 12 and include spindles 30 supported in rows by a plurality of upright picker bars 32.

Each picker bar 32 includes a cam arm with an upper cam roller 40 supported within a cam track 42. The track orients the bars 32 for the desired spindle position as the drum rotates about its upright axis. Doffer columns 48 and 49 are supported for rotation about upright axes 50 and 51 for doffing cotton from the spindles 30. Supported adjacent the forwardmost extremities of the drums 26 and 27 are upright moistener columns 52 and 53 for wiping the spindles 30 after cotton is doffed therefrom.

The drive mechanism rotates the drums and doffers in the counterclockwise direction as viewed in FIG. 1. The drums 26 and 27 rotate through the four quadrants (Q1–Q4). The rotating cotton-wrapped spindles 30 are moved under the doffers of the doffer columns 48 and 49 in quadrant Q3, and cotton is doffed from the spindles and directed rearwardly and outwardly to suction door structure 70.

The door structure 70 includes a specially shaped outer wall portion or access door 72 pivotally connected to the forward structural member 14 for rocking about an upright axis between a closed harvesting position (solid lines of FIG. 1) and an open access position (broken lines of FIG. 1). The access door 72 is described in detail below. The door structure 70 also includes an aft portion 74 opening rearwardly at 75 into the lowermost portion of an upright duct 78. The aft portion 74 includes an innermost extremity 82 which lies on or closely adjacent an upright fore-and-aft extending plane generally containing the axis 51 of the rear doffer. The fore-and-aft plane also touches the outermost portion of the cam for the rear drum 27.

The aft portion 74 also includes an outermost extremity 84 near the top of the unit 10 which is offset a distance D1 from the center of the row centerline or receiving area 20. For accommodating cotton planted in very narrow row spacings, the distance D1 is preferably less than approximately 60 centimeters (23.6 inches). The door structure 70 with the specially shaped access door 72 facilitates movement of the unit 10 with an adjacent cotton plant row centerline (such as shown at R2 in FIGS. 1 and 3) closely adjacent or aligned with the outermost extremity 84 of the row unit housing 12.

The upright duct 78 has outer sidewalls 86 and 88 generally in alignment with the respective innermost and outermost extremities 82 and 84. An upright divider panel 92 extends rearwardly and outwardly around the rear drum 27 and the rear doffer column 49 to direct cotton from the forward drum 26 towards a fore-and-aft extending door area between the panel 92 and the wall 72 which opens rearwardly towards the outermost portion of the opening 75. The doffer column axes 50 and 51 are aligned and are located closely adjacent a fore-and-aft extending plane passing through the drum axes 28 and 29. As can be appreciated from FIG. 1, the rearwardly directed opening at 75 is located close to the row centerline or row receiving area 20 directly behind the doffer column 49 (the innermost portion of the opening 75 overlaps a substantial portion of the doffer column 49—from approximately the centerline of the doffer column outwardly as shown in FIG. 1) for relatively direct entry of the cotton from the rear drum 27 into the conveying air stream.

The access door 72 includes a forwardmost upright edge 102 pivotally connected by a vertical hinge 104 to the structural member 14 adjacent the front drum 26 and the front doffer 48. The access door 72 has a generally planar, fore-and-aft extending lower wall section 108 which extends downwardly to a unit floor area 114 from the lower edge of an upwardly diverging reinforcing and funnelling section 115. An upper panel 120 extends upwardly from the upper edge of the section 115 to an uppermost extremity 122 generally level with a top portion 124 of the row unit housing 12. Leading portion 120f of the panel 120 converges in the forward direction at a vertical bend location 128 toward the structural member 14 and helps guide taller plants around the side of the door structure. A door top portion 130 extends inwardly at a right angle from the uppermost extremity 122 to close the top of the door structure between the panel 120 and the top portion 124 of the unit housing 12.

The access door 72 has an upright rear edge 132 with cross section that conforms to the cross section of the leading edge of the aft portion 74 (FIG. 3) so that the access door 72 mates with the aft portion 74 to provide a continuous cotton conveying path rearwardly through the door structure 70. To releasably retain the access door 72 in the closed position (solid lines of FIG. 1) for harvesting, upper and lower swing latches 140 and 142 are pivotally connected to the aft ends of the panel 120 and the wall section 108, respectively, and are received by corresponding latch retainers 144 and 146 fixed to the aft portion 74. With the access door 72 latched in the harvesting position, a generally closed, upright cotton conveying compartment is provided which extends in the fore-and-aft direction adjacent the harvesting mechanism and opens rearwardly at 75 into the lower end of the duct 78. The aft portion 74 includes a lower upright panel 148 extending rearwardly from the panel 108, an angled funnelling section 155 extending rearwardly from the funnelling section 115, and an upper upright panel 160 extending rearwardly from the panel 120. The funnelling sections 115 and 155 converge in the downward direction toward the opening at 75 and define with the recessed panels 148 and 108 a plant accommodation space 170 for receiving plants in the row R2 (FIG. 3) to thereby reduce adjacent row plant damage and cotton loss.

The access door cross section provides rigidity and strength, and the door 72 may be fabricated from a lightweight, non-metallic material such as plastic. By hinging the door 72 near the forward drum 26, cotton plants in the row R2 adjacent the row being harvested by the unit 10 (to the right of the unit 10 as viewed in the forward direction F in FIG. 1) which brush by the unit, especially when very narrow row cotton is being harvested, will tend to urge the door in the clockwise direction towards the closed harvesting position, even if the latches 140 and 142 are unlatched.

To inspect and provide access to the harvesting structure within the unit 10, the operator simply lifts the latches 140 and 142 from the retainers 144 and 146 and swings the door 72 in the counterclockwise direction about the axis of the hinge 104 to the open access position (broken lines of FIG. 1). Easy access then is available to the structure in the housing 12, including both sets of doffers and drums, from the rear of the units. When the operator is finished with the inspection and maintenance, he swings the access door to the closed harvesting position and secures the latches 140 and 142 in the retainers 144 and 146.

Having described the preferred embodiment, it will become apparent that various modifications can be made without departing from the scope of the invention as defined in the accompanying claims.

I claim:

1. In a cotton harvester for harvesting cotton planted in rows in a field, an upright row unit adapted for forward movement through the field, the row unit comprising:

a fore-and-aft extending row unit housing defining a row receiving area;

a cotton conveying duct located at the aft end of the row unit;

a first harvesting drum supported by the housing for rotation about an upright axis beside the row receiving area, the drum including a plurality of spindles for picking cotton from a row of cotton plants in the row receiving area;

a second harvesting drum supported by the housing rearwardly of the first drum;

door structure connected to the row unit housing and extending rearwardly from a forward location outwardly adjacent the first drum toward the aft end of the row unit, the door structure including a rearward discharge area opening into the cotton conveying duct;

doffer columns located adjacent the harvesting drums for removing picked cotton from the spindles and directing the cotton outwardly to the door structure; and wherein the door structure includes an access door hinged adjacent the forward location and extending rearwardly to a location adjacent the second harvesting drum, the access door swingable about the forward location from a closed harvesting position to an open access position providing a forwardly and inwardly opening area to facilitate access to the harvesting drum, and wherein a row of cotton plants next adjacent the row of plants being harvested by the row unit tends to bias the access door to the closed position as the row unit moves forwardly.

2. The invention as set forth in claim 1 wherein the access door diverges outwardly in the upward direction so that a row unit bottom area is defined that is narrower than an upper portion of the row unit to provide an accommodation space for cotton plants in an adjacent row.

3. The invention as set forth in claim 1 wherein the access door has a centrally located fore-and-aft extending portion with a converging cross section to thereby increase the strength of the door.

4. The invention as set forth in claim 1 wherein the row unit includes a rearward portion which is nondivergent outwardly relative to the row receiving area from a location adjacent the rear drum to the aft end of the unit, and wherein the access door diverges outwardly in the upward direction.

5. The invention as set forth in claim 2 wherein the access door has an uppermost extremity generally aligned with an uppermost extremity of the row unit housing, the door converging inwardly from its uppermost extremity to a central location, thereby defining the accommodation space for an adjacent row of cotton, the accommodation space being wider near the bottom area than at the uppermost extremity.

6. The as set forth in claim 5 wherein the discharge opening has an upper edge adjacent the central location so that the access door funnels cotton toward the opening as the cotton moves downwardly and rearwardly in the door structure.

7. In a cotton harvester for harvesting cotton planted in rows in a field, a fore-and-aft extending row unit adapted for forward movement through the field, the row unit comprising:

a fore-and-aft extending row unit housing having a top and a bottom and defining a row receiving area;

a cotton conveying duct supported adjacent the housing;

a harvesting drum supported by the housing for rotation about an upright axis beside the row receiving area, the drum including a plurality of spindles for picking cotton from a first row of cotton plants in the row receiving area;

door structure connected to the housing and extending rearwardly from a forward location outwardly adjacent the drum toward the aft end of the row unit, the door structure including a discharge area opening into the cotton conveying duct;

a doffer column located near the harvesting drum for removing picked cotton from the spindles and directing the cotton outwardly to the door structure; and wherein the door structure includes an access door pivotally connected to the housing, the access door swingable from a closed harvesting position to an open access position and providing an inwardly opening area to facilitate access to the harvesting drum when in the access position, said access door having a rigidifying section comprising an inwardly offset area.

8. The invention as set forth in claim 7 wherein the inwardly offset area includes an angled wall section angling in the downward direction toward the discharge area for funneling cotton toward the cotton conveying duct and increasing the distance from the wall section to an adjacent row of cotton to thereby reduce contact between a lower portion of the cotton plants in the adjacent row of cotton and the door structure.

9. The invention as set forth in claim 7 wherein the access door includes a forward portion pivotally connected to a forward portion of the row unit housing so that cotton plants in a row adjacent the first row tend to bias the door to the closed harvesting position as the row unit is moved forwardly through the field and so the inwardly opening area opens in the forward direction for facilitating operator access to the first and second drums from the rear of the unit.

10. The invention as set forth in claim 8 wherein the access door defines an outermost wall of the door structure and includes a generally vertical upper portion extending downwardly from the top of the housing to the inwardly offset area, the inwardly offset area located centrally in the vertical direction relative to the top and bottom of the housing, the access door further including a lower portion extending generally vertically from the angled wall section toward the bottom of the unit.

11. In a cotton harvester for harvesting cotton planted in narrowly spaced rows in a field, row unit structure adapted mounting on the rear of a tractor for forward movement through the field, the row unit structure comprising:

first and second fore-and-aft extending row unit housings defining adjacent row receiving areas and supporting harvesting structure for removing cotton from two rows of plants;

a cotton conveying duct supported adjacent each of the housings;

door structure supported by the first housing and extending rearwardly from a forward location adjacent the harvesting structure, the door structure including a discharge area opening into the cotton conveying duct and an access door movable relative to the first housing between an open access position and a closed harvesting position;

doffing structure for directing cotton from harvesting structure toward the door structure; and wherein the door structure includes an outer wall located between the harvesting structure and an adjacent row of cotton plants so that the adjacent row of cotton plants contacts the outer wall as the row unit structure is moved forwardly through the field, the outer wall angling inwardly toward the row receiving area of the first housing to thereby increase clearance between the cotton plants in the adjacent row of cotton plants and the first housing so that adjacent row cotton plant damage and cotton loss are reduced.

12. The invention as set forth in claim 11 wherein the outer wall forms at least a portion of the access door, the access door when in the open access position providing an inwardly opening area to facilitate access to the harvesting structure, the access door when in the closed harvesting position funneling cotton toward the cotton conveying duct.

13. The invention as set forth in claim 12 wherein the access door includes a forward portion pivotally connected to a forward portion of the row unit housing so that the adjacent row of cotton plants urges the door to the closed harvesting position as the row unit is moved forwardly through the field.

14. The invention as set forth in claim 13 wherein the access door opens outwardly toward the second row unit and opens in a rearwardly direction for facilitating operator access to the harvesting structure from the aft end of the first row unit housing.

15. The invention as set forth in claim 11 wherein the outer wall angles inwardly toward the row receiving area of the first row unit housing so that the clearance is increased for lower portions of the cotton plants in the adjacent row of cotton plants.

16. The invention as set forth in claim 11 wherein the outer wall includes an uppermost fore-and-aft extending planar portion extending downwardly to an inwardly offset central fore-and-aft extending portion, the central portion providing rigidifying of the access door, and a lower door portion extending downwardly from the central portion.

17. The invention as set forth in claim 16 wherein the outer wall comprises a forwardmost upright and generally straight edge pivotally connected to the first housing for rocking of the outer wall about an upright axis located near the forward end of the first housing.

18. The invention as set forth in claim 16 wherein the central portion angles toward the cotton conveying duct for funnelling the cotton into the duct.

19. The invention as set forth in claim 16 wherein the access door has a rear portion of preselected cross section and the door structure includes a mating aft portion with cross section generally identical to the preselected cross section located rearwardly of the aft end of the access door, and latch structure releasably securing the aft end of the access door to the mating aft portion.

20. The invention as set forth in claim 12 wherein the discharge area is located at the lower, aft end of the door structure, and wherein the access door angles towards the discharge area.

21. In a cotton harvester for harvesting cotton planted in narrowly spaced rows in a field, row unit structure adapted mounting on a vehicle for forward movement through the field, the row unit structure comprising:

a fore-and-aft extending row unit housing defining a row receiving area and supporting harvesting structure for removing cotton from a row of cotton plants;

cotton conveying duct structure supported adjacent the housing;

door structure connected to the housing, at least a portion of the door structure being movable relative to the housing between an access position facilitating access to the harvesting structure and a closed harvesting position, the door structure extending rearwardly from a forward location outwardly adjacent the harvesting structure and opening into the cotton conveying duct structure;

doffing structure for directing cotton from the harvesting structure toward the door structure; and wherein the door structure includes outer wall structure located between the harvesting structure and an adjacent row of cotton plants so that the adjacent row of cotton plants contacts the outer wall structure as the row unit structure is moved forwardly through the field, the outer wall structure angled inwardly in the downward direction toward the row receiving area to thereby define a plant accommodation space for the adjacent row of cotton plants and reduce plant damage and cotton loss in the adjacent row of cotton plants.

22. The invention as set forth in claim 21 wherein the outer wall structure comprises panel structure having an upper portion; and wherein, when the door structure is in the closed harvesting position, the upper portion is located over the adjacent row of cotton plants.

23. The invention as set forth in claim 21 wherein the outer wall structure comprises upper and lower panel sections connected by a centrally located funneling section.

24. The invention as set forth in claim 21 wherein the door structure includes an access door hinged adjacent the forward location and extending rearwardly therefrom, the access door swingable about the forward location from a closed harvesting position to an open access position, wherein a row of cotton plants next adjacent the row of plants being harvested by the row unit tends to bias the access door to the closed position as the row unit moves forwardly.

* * * * *